(12) United States Patent
Jackson

(10) Patent No.: US 9,753,765 B1
(45) Date of Patent: Sep. 5, 2017

(54) MULTI-PROCESSOR INTEGRATED CIRCUITS

(75) Inventor: Robert Jackson, Headington (GB)

(73) Assignee: Altera Corporation, San Jose, CA (US)

( * ) Notice: Subject to any disclaimer, the term of this patent is extended or adjusted under 35 U.S.C. 154(b) by 1883 days.

(21) Appl. No.: 10/806,639

(22) Filed: Mar. 22, 2004

(51) Int. Cl.
*G06F 9/46* (2006.01)
*G06F 9/48* (2006.01)

(52) U.S. Cl.
CPC .................. *G06F 9/4812* (2013.01)

(58) Field of Classification Search
CPC .................................................... G06F 9/4812
USPC .......................... 718/100, 102, 108; 712/244
See application file for complete search history.

(56) References Cited

U.S. PATENT DOCUMENTS

| | | | | |
|---|---|---|---|---|
| 4,378,589 A * | 3/1983 | Finnegan et al. | .................. | 712/2 |
| 4,860,190 A * | 8/1989 | Kaneda et al. | ................. | 710/49 |
| 5,197,138 A * | 3/1993 | Hobbs et al. | ................. | 712/222 |
| 5,410,710 A * | 4/1995 | Sarangdhar et al. | ......... | 710/266 |
| 5,448,743 A * | 9/1995 | Gulick et al. | ................... | 710/49 |
| 5,691,493 A * | 11/1997 | Usami et al. | ................... | 84/602 |
| 5,724,537 A * | 3/1998 | Jones | ................................ | 711/1 |
| 5,761,534 A * | 6/1998 | Lundberg et al. | .............. | 710/50 |
| 5,920,572 A * | 7/1999 | Washington et al. | ......... | 370/535 |
| 6,098,144 A * | 8/2000 | De Oliveira et al. | ........ | 710/269 |
| 6,212,607 B1 * | 4/2001 | Miller et al. | .................. | 711/149 |
| 6,275,864 B1 * | 8/2001 | Mancusi et al. | .............. | 709/250 |
| 6,928,502 B2 * | 8/2005 | Monteiro | ...................... | 710/265 |
| 7,058,744 B2 * | 6/2006 | Kawaguchi | ................... | 710/268 |
| 2003/0041173 A1 * | 2/2003 | Hoyle | ........................... | 709/248 |
| 2004/0044874 A1 * | 3/2004 | Leach et al. | .................. | 711/220 |

* cited by examiner

*Primary Examiner* — H S Sough
*Assistant Examiner* — Kimberly Jordan
(74) *Attorney, Agent, or Firm* — Fletcher Yoder, P.C.

(57) ABSTRACT

An integrated circuit unit and method for synchronizing processing threads running on respective processors are provided. The unit includes an interrupt request controller which is programmable to provide a first desired number of synchronization objects and a second desired number of interrupt request signals for supply to such processors. The controller is operable to direct and interrupt request signals to a chosen processor in dependence upon data received from the processors.

32 Claims, 2 Drawing Sheets

MULTI-PROCESSOR INTEGRATED CIRCUITS

BACKGROUND OF THE INVENTION

Field of the Invention

The present invention relates to multiprocessor integrated circuits, in general, and to synchronisation of multiple microprocessors implemented on an integrated circuit, in particular.

Description of Related Art

Multiple microprocessors implemented on integrated circuits typically communicate through shared memory using memory mapped registers or general purpose input/output devices (GPIO's) connected to system interrupt signals as a mechanism for synchronising with one another. FIG. 1 is a diagrammatic representation showing one example of a system 1 on a programmable integrated circuit. The system 1 includes a first processor PA, a second processor PB, a shared memory device SMC and a memory mapped register RD. The processors PA and PB may include any logical mechanism known to those skilled in the art for supporting an instruction set. In one example, the processors PA and PB may include a central processing unit (CPU) or a digital signal processing (DSP) core having arithmetic logic units (ALUs) and multiply accumulate blocks (MACs). The processors PA and PB are operable to transfer data with the shared memory SMC, and with the memory mapped register RD. As will be described in more detail below, the memory mapped register RD is operable to output interrupt requests IRQPA and IRQPB to the processors PA and PB respectively.

Multi-processor systems often use sophisticated memory management systems to support synchronisation (for example, cache coherency, or locked memory blocks). Some processors allow semaphores to be implemented using "atomic" test-and-set (exchange) instructions. Semaphores are well known in the art and are used to control access to shared resources, such as memory, in multi-processor environments.

"Atomic" instructions are basic instructions which allow a semaphore to be tested or set.

In prior art system, various ad-hoc schemes are implemented on an application-by-application basis in order to synchronise multiple processors. In one known scheme, illustrated in FIG. 1 of the accompanying drawings, information is transferred between processors PA and PB in a number of steps. For example, to transfer data from processor PA to processor PB, processor PA places some data in a shared memory SMC. Processor PA then writes a data value to a memory mapped register RD. The register RD is connected to an interrupt request port on processor PB. When the processors PA and PB are provided on a single integrated circuit, the register RD is also provided on that integrated circuit. When the processors PA and PB are not implemented on the same integrated circuit RD is provided by a general purpose input/output device, GPIO. The act of writing a data value to the register to RD causes an interrupt request (IRQ) to be passed to the processor PB. This interrupt request IRQ causes the processor PB to execute an interrupt service routine (ISR). The processor PB now reads the stored data out of the shared memory SMC.

The method described scheme can also be used in a reverse fashion so that the processor PB can send data and an interrupt request to processor PA. Such bidirectional communication allows a so-called "handshake" to be performed. That is, processor PA can generate an interrupt request communicating to PB the message "the data in SMC is ready", processor PB then generates an interrupt request to processor PA communicating back to PA the message "I have finished with the data". This communication between processors allows processes (or threads) running on respective processors to synchronise and communication with one another.

However, the scheme as described above relies on the integrated circuit hardware designer to construct a protocol for synchronising processes using interrupt requests (IRQs) and interrupt service routines (ISRs). If the application software is changed so that different communication patterns are required, new memory mapped registers (RD) and interrupt (IRQ) connections will have to be added and the hardware rebuilt. Such redesign and rebuild is clearly inefficient and costly.

SUMMARY OF THE PRESENT INVENTION

Embodiments of the present invention provide mechanisms for allowing a plurality of application processes running on a plurality of processors to communicate and synchronise with one another. Embodiments allow application software to be rewritten without the need for redesign and rebuild of hardware. Embodiments of the present invention allow complex multi-threaded multi-processor systems to be constructed more quickly than previous design solutions.

A hardware IP block provides a group of semaphores that can be manipulated (Post, Pend, Set) by a number of microprocessors. The hardware block generates a number of interrupt signals. Mask registers, associated with respective interrupts, allow the processors to select the conditions which cause an interrupt to be generated.

According to one aspect of the present invention, there is provided an integrated circuit unit for synchronising processing threads running on respective processors, the unit including an interrupt request controller which is programmable to provide a first desired number of synchronisation objects and a second desired number of interrupt request signals for supply to such processors, wherein the controller is operable to direct and interrupt request signals to a chosen processor in dependence upon data received from the processors.

According to another aspect of the present invention, there is provided a method of synchronising multiple processing threads running on respective processors, the method comprising providing a first desired number of synchronisation objects and a second desired number of interrupt request signals, receiving an input command, and outputting an interrupt request signal in dependence upon the input command and on a programmable range of parameters relating to interrupt conditions.

DETAILED DESCRIPTION OF THE PREFERRED EMBODIMENTS

Figure 1:
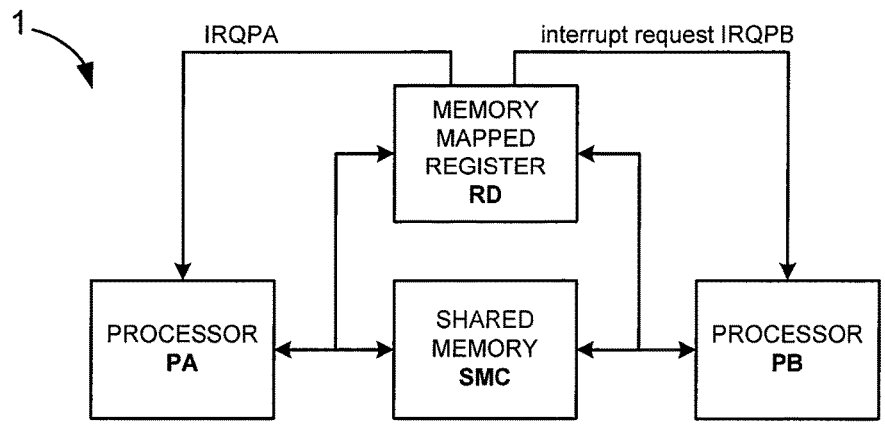
FIG. 1 illustrates a previously considered multiprocessor system.
Figure 2:
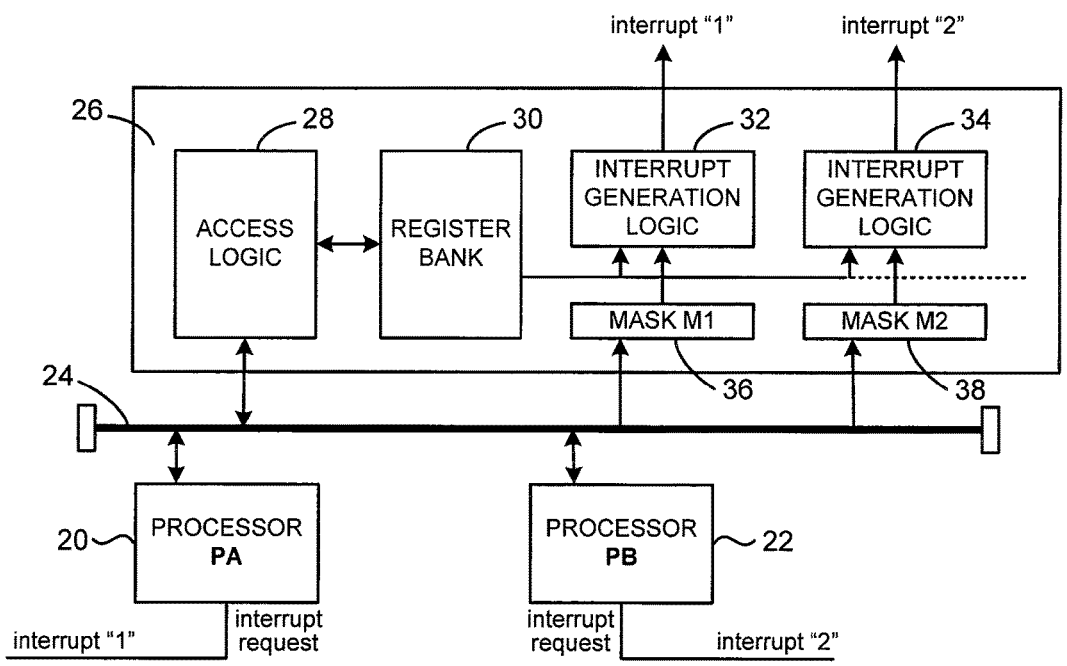
FIG. 2 illustrates a multiprocessor system embodying the present invention.

FIG. 2 shows the structure of an exemplary multiprocessor system including a synchronisation block operable in accordance with an embodiment of the present invention. The system shown in FIG. 2 includes processors PA 20 and PB 22 which are connected for bidirectional data transfer with a bus 24. A synchronisation block 26 is also connected for bidirectional data transfer with the bus 24. The synchronisation block 26 incorporates access logic 28 which is connected bidirectionally with the data bus 24, a register bank 30 connected for bidirectional data transfer with the access logic 28, a pair of interrupt generation units 32 and 34 which are operable to produce interrupt request signals IRQ1 and IRQ2 respectively. Mask registers 36 and 38 are connected to receive data from the bus 24 and to supply control data to the interrupt generation units 32 and 34 respectively. Processors 20 and 22 are connected to receive interrupt requests IRQ1 and IRQ2 respectively. In the example embodiment shown in FIG. 2, there are two processors, and correspondingly two mask registers and two interrupt generation units. It will be readily appreciated that the number of processors is arbitrary and depends upon the number of processors required by the system designer. For each processor that is added, an additional mask register and an additional interrupt generation unit must be provided in the synchronisation unit 26. However, it should be noted that in a system some processors may have multiple interrupt signals and some none. The one-to-one relationship between interrupts and processors in the example system is coincidental.

The register bank 30 operates to store data synchronisation objects semaphores or mailboxes for synchronising processing threads running on the processors 20 and 22. These semaphores can be manipulated by the processors 20 and 22 by reading (load) or writing (store) to memory mapped locations over the bus 24. The processors 20 and 22 operate to load and store data to the access logic 28. The access logic 28 converts these load/store instructions into the appropriate operations (e.g. test-and-set, semaphore Post, mailbox clear, etc) for supply to the register bank, and hence to manipulate the semaphores. The value stored in the memory corresponds to either the semaphore value (0..N or 0/1 for counting and binary respectively) or the mailbox contents.

The access logic converts read (ie. load from) a certain address into an atomic operation that retrieves the value from the memory, supplies the value to the reading processor, decrements the value, places the new decremented value back in the memory replacing the previous value and generates any interrupt signals necessary. Other operations to load a value (set), set a value to zero (clear), or to read a value without modifying it are possible.

This use of simple load/store instructions from the processors 20 and 22 means that the software applications running the processing threads on processors 20 and 22 can be changed easily, without the need for hardware changes. Any changes in the application software running on the processors 20 and 22 need only conform to the load/store instruction set used by the synchronisation unit in order to generate the relevant interrupt request signals IRQ1 and IRQ2.

The interrupt generation logic units 32 and 34 receive outputs from the register bank 30. The outputs from the register bank 30 are the results of the synchronisation objects or semaphores being manipulated by data supply from the processors 20 and 22. The synchronisation objects and semaphores will be described in more detail below. The interrupt generation logic units 32 and 34 also receive masked data inputs from respective mask registers 36 and 38. The mask registers 36 and 38 receive data from the bus 24, from processors 22 and 20 respectively. The values stored in the mask registers 36 and 38 set the conditions under which interrupt requests can be generated by the corresponding interrupt generation unit 32 and 34 respectively. For example, processor 20 could load mask register 36 with a data value such that only under certain conditions could interrupt 1 IRQ1 be generated from the interrupt generation logic unit 32. In this way, the processors can control when they are able to receive interrupt requests from the synchronisation unit 26, and when such interrupt requests are forbidden. For example, if a processor is running a high priority processing thread, that does not require any communication with other processors, then the mask register can be set to prevent interrupts to that processing thread being requested unless a higher priority processing thread is involved.

Figure 3:
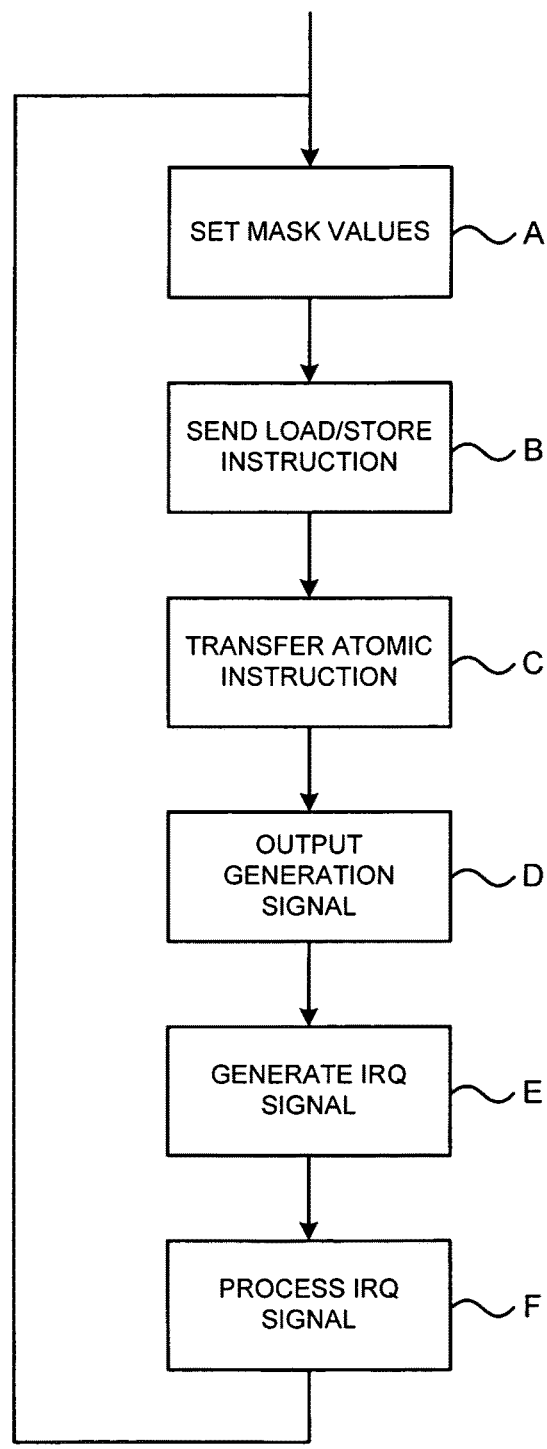
FIG. 3 illustrates steps and a method embodying the present invention.

FIG. 3 is a flow chart illustrating a method embodying the present invention. The method will be described with reference to processor PA (20) producing an interrupt request for PB. It will be readily appreciated, however, that the method is applicable to any processor. At step A, the processor 20 sets a mask value in the appropriate mask register 36. This mask value set the conditions under which an interrupt request can be generated by the corresponding interrupt generation unit, as described above. At step B, the processor 20 sends a load/store instruction to the access logic 28 in order to cause an interrupt to be generated. The access logic 28 makes a change to a value in the register bank 30 which causes the register bank 30 to output an interrupt generation signal to the appropriate interrupt generation unit 34. The interrupt generation unit 34 then generates (step E) an interrupt request signal IRQ2 for supply to the processor 22. The processor 22 then processes (step F) IRQ2 in accordance with the processing thread running on processor 22 software.

As described above, the register bank contains several synchronisation objects, or semaphores, and these will now be described in more detail.

Counting Semaphore Block

A counting semaphore is a synchronisation object which has a value associated with it that which changes as it is manipulated. Threads can perform a number of operations on a semaphore:

```
set (s, val)    // set S to value VAL
pend(s)         // if S is greater than 0 decrement S
                // else wait for S to be greater than 0, then decrement its
                value
post (s)        // increment the value of S
```

One possible implementation the register bank implements 16 16-bit semaphores, each having a value between 0 and 65355.

The ACCESS LOGIC implements a memory mapped interface to 48 16-bit locations:

```
{
  unsigned short pend[16]; // [read only] read current value,
  decrement if>0
  unsigned short post[16]; // [write only] increment current value
  unsigned short  set[16]; // [write only] set semaphore value
}
```

A read access (microprocessor LOAD) from locations 0 to 15 returns the current value of semaphore 0 to 15 respectively. If the value is greater than 0 the semaphore's value is decremented and the new value stored in the register bank.

A write access (microprocessor STORE) to locations 16 to 31 causes the value of semaphore 0 to 15 to be incremented.

A write access (microprocessor STORE) to locations 32 to 47 sets the value of semaphore 0 to 15 to the value written by the processor.

In one implementation, the mask registers 24 and 36 have identical behaviour and are provided by respective 16-bit memory mapped registers:

{
  unsigned short irq_if_sem_not_zero_mask;
}

Setting bit N of the mask to "1" causes an interrupt to be generated if semaphore N is non-zero. Alternatively, the system could be set such that a semaphore N is zero.

The interface to the mask is extended slightly to allow bits to be set and cleared independently:

```
{
  unsigned short              // [read/write] - mask
  irq_if_sem_not_zero_mask;
  unsigned short irq_set_bits;    // [write only] - set bits in mask
  unsigned short irq_clear_bits;  // [write only] - clear bits in mask
}
```

Writing (STOREing) a value V into memory location "irq_set_bits" causes the bits in the mask corresponding to any non-zero bits in V to be set; writing a value V into memory location "irq_clear_bits" causes the bits in the mask corresponding to any non-zero bits in V to be cleared. Independent access to the bitmask allows a number of threads to manipulate it safely.

The Pend, Post and Set operations can now be implemented in software using the synchronisation block. Operations such as query (read the current value without changing it or waiting if it is zero) can be also be implemented in software:

```
sem set(int number, unsigned short value)
    sem_block->set[number] = value;     // causes a write to the
                                         synchronisation block
sem post(int number)
    sam_block->post[number] = 1;        // causes a write to the
                                         synchronisation block
sem pend(int number)
    if (sem_block->pend [number] ==0)   // read value (decrement
                                         if not zero)
        sem_block->irq_set_bits =(1<<number)
        while (sem_block->pend[number] ==0) wait_for_interrupt
        sem_block->irq_clear_bits = (1<<number)
```

The sem_pend operation relies on a "wait_for_interrupt" service that is provided by the processor or the operating system running on it.

Binary Semaphore Block

A binary semaphore is identical to a counting semaphore except that is range is limited to the values 0 and 1. This simplifies the implementation as a single flip-flop is needed for each semaphore. The access logic can be simplified to support two operations:

Set/Post
  writing to a memory location associated with a semaphore sets its value to "1"

Pend/Clr
  reading from a memory location associated with a semaphore returns the current value and sets the semaphore's value to "0"

Mailbox Block

A mailbox is a memory location into which a single "message" can be placed for collection. The mailbox can be empty or full. Typically a mailbox contains a single word of data with the value 0 signifying empty. The operations performed on a mailbox may include:

```
Post (V)    // place value V in the mailbox
Clear ( )   // make the mailbox empty
Read ( )    // read the current value in the mailbox (or 0 if empty)
Pend ( )    // read the value from the mailbox, if empty wait for full
```

The mailbox block is similar to the semaphore block. In fact its interrupt generation logic is identical. The only change is that the ACCESS LOGIC now allows the current value to be read without modification and a successfully pend access causes the current value to be set to zero rather than decremented:

```
{
  unsigned short pend[16]; // [read only] read current value, set to 0
  if currently non-zero
  unsigned short read[16]; //[read only] read current value
  unsigned short  set[16]; //[write only] set mailbox value
}
```

The mailbox access functions can now be implemented in software:

```
mbox post (int number, unsigned short value)
    mbox_block->set[number] = value;
mbox_clear (int number)
    mbox_block->set[number] = 0
mbox_read (int number, unsigned short *value)
    *value = mbox_block->read[number]
mbox_pend (int number, unsigned short *value)
    if ( (*value = mbox_block->pend[number]) ==0)
        mbox_block->irq_set_bits = (1>>number)
        while ((*value = mbox_block->pend[number]) == 0)
        wait_for_interrupt
        mbox_block->irq_clear_bits = (1<<number)
```

A "blocking" Pend operation waits for the mailbox to be empty if it is currently full. Such an operation can be constructed by associating a semaphore with the mailbox.

Mixed Function Block

The counting semaphore and mailbox functionality is quite similar and can be combined to provide a block which is able to act as a group of semaphores or as a group of mailboxes depending on which software functions are used to access it. The interface to the access logic for the mixed block is:

```
{
  unsigned short pend_decrement[16]; // [read only] read current value,
  decrement if>0
  unsigned short pend_clear[16]; // [read only] read current value,
  set to 0 if currently non-zero
  unsigned short read[16]; // [read only] read current value
  unsigned short set[16]; // [write only] set current value
}
```

Embodiments of the invention allows the systems which contain multiple processors running numerous software threads to be quickly constructed as a single block supports multiple synchronisation objects.

As a mask allows numerous conditions to be specified a single interrupt vector can be used to wait for multiple synchronisation events.

As the use of synchronisation objects and the control of where interrupts are generated is completely under software control the software can be changed to move thread between processors at design time or run time without requiring hardware changes.

This invention allows systems containing multiple embedded software processors to be quickly constructed.

It allows a single reference design to support multiple software configurations.

It provides a basic building block that implements in hardware some of the services provided by single-processors real time operations systems.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using firmware, software, or hardware. Moreover, embodiments of the present invention may be employed with a variety of different file formats, languages, and communication protocols and should not be restricted to the ones mentioned above. Therefore, the scope of the invention should be determined with reference to the appended claims.

The invention claimed is:

1. A method of synchronizing processing threads running on a plurality of processors, the method comprising:
   receiving a first mask value from a first processor in the plurality of processors, the first processor corresponding to a first interrupt generating circuit, wherein the first mask value indicates a first condition under which interrupt requests may be generated by the first interrupt generating circuit;
   receiving a first command from a software application running the processing threads on a second processor in the plurality of processors, the second processor corresponding to a second interrupt generating circuit, wherein the first command comprises a load instruction, a store instruction, or both;
   converting the first command to a first operation to manipulate a first at least one synchronization object stored in a register bank;
   using the first operation to manipulate the first at least one synchronization object;
   determining if an interrupt signal can be provided to the first processor by:
      determining if the first condition indicated by the first mask value is met by the first at least one synchronization object after manipulation; and
      if the first condition is met by the first at least one synchronization object, then:
         outputting an interrupt generation signal to the first interrupt generating circuit; and
         outputting the first interrupt signal, from the first interrupt generating circuit, to the corresponding first processor, based upon the interrupt generation signal;
      otherwise, not outputting the first interrupt signal to first processor.

2. The method of claim 1 wherein the first mask value and the first command are received using a bi-directional bus.

3. The method of claim 2 wherein the first interrupt signal is output on a first line, the first line separate from the bi-directional bus.

4. The method of claim 3 further comprising:
   receiving a second mask value from the second processor;
   receiving a second command from the first processor;
   converting the second command to a second operation to manipulate a second at least one synchronization object stored in a register bank;
   using the second operation to manipulate the second at least one synchronization object;
   determining if a second condition set by the second mask value is met by the second at least one synchronization object; and
   if the second condition is met by the second synchronization object, then outputting a second interrupt signal, from the second interrupt generating circuit, to the second processor, otherwise not outputting the second interrupt signal to the second processor.

5. The method of claim 3 wherein the first command is a load/store command.

6. The method of claim 5 wherein the at least one first synchronization object comprises a counting semaphore, a binary semaphore, or both.

7. The method of claim 5 wherein the at least one first synchronization object comprises a mailbox register.

8. The method of claim 3 where the first operation comprises a set operation wherein a value of the at least one first synchronization object is set.

9. The method of claim 3 wherein the first operation comprises a semaphore pend operation wherein when a value of the at least one first synchronization object is greater than zero, the value of the at least one synchronization object is decremented.

10. The method of claim 3 wherein the first operation comprises a semaphore post operation wherein a value of the at least one first synchronization object is incremented.

11. The method of claim 3 where the at least one first synchronization object comprises both a semaphore and a mailbox register.

12. The method of claim 1 wherein the first interrupt signal is not output to the first processor and no interrupt is generated when the first mask value indicates an inactive state.

13. An integrated circuit, comprising:
   a first processor;
   a second processor; and
   a synchronizing block coupled to the first processor and the second processor, the synchronizing block comprising:
      a register bank comprising a plurality of registers for storing synchronization objects;
      access logic that:
         receives commands from software applications running processing threads on the first and second processors, the commands comprising load instructions, store instructions, or both;
         converts the commands to operations that manipulate the synchronization objects; and executes the operations on the synchronization objects to manipulate a first one of the synchronization objects or a second one of the synchronization objects;

a first interrupt generating circuit, corresponding to the first processor, coupled to the register bank and further coupled to a first mask register, wherein the first interrupt generating circuit:

determines if the first one of the synchronization objects after manipulation meets a condition indicated by a first mask value of the first mask register; and if the first one of the synchronization objects after manipulation meets the condition indicated by the first mask value, outputs a first interrupt signal to an input of the first processor; and a second interrupt generating circuit, corresponding to the second processor, coupled to the register bank and further coupled to a second mask register, wherein the second interrupt generating circuit:

determines if the second one of the synchronization objects after manipulation meets a condition indicated by a second mask value of the second mask register; and if the second one of the synchronization objects after manipulation meets the condition indicated by the second mask value, outputs a second interrupt signal to an input of the second processor.

14. The integrated circuit of claim 13 further comprising a bi-directional bus coupled to the first processor, the second processor, and the synchronization block.

15. The integrated circuit of claim 14 wherein the first interrupt generating circuit provides interrupt requests on a first line and the second interrupt generating circuit provides interrupt requests on a second line, the first line and the second line separate from the bi-directional bus.

16. The integrated circuit of claim 15 wherein the first mask value is received from a first mask register and the second mask value is received from a second mask register.

17. The integrated circuit of claim 15 wherein the first mask value is provided by the first processor and the second mask value is provided by the second processor.

18. The integrated circuit of claim 15 wherein the second interrupt generating circuit provides interrupt requests to the second processor when the received synchronizing objects meet a condition set by the second mask value.

19. The integrated circuit of claim 15 wherein the first processor is a central processing unit.

20. The integrated circuit of claim 15 wherein the first processor is a digital signal processor.

21. The integrated circuit of claim 15 wherein the commands comprise load/store commands.

22. The integrated circuit of claim 15 wherein the synchronization objects comprise semaphores and mailbox registers.

23. The integrated circuit of claim 15 where the operations comprise:

a set operation wherein a value of a synchronization object is set;

a semaphore pend operation wherein when a value of a synchronization object greater than zero, the value of the synchronization object is decremented; and a semaphore post operation wherein a value of a synchronization object is incremented.

24. An integrated circuit comprising:

access logic to receive commands from software applications running processing threads on a first processor, a second processor, or both, to generate operations that may be performed on synchronization objects to manipulate the synchronization objects, and to perform the operations on the synchronization objects to manipulate at least one of the synchronization objects, wherein the commands comprise load instructions, store instructions, or both;

a register bank comprising a plurality of registers that store the synchronization objects;

a first mask register that stores a first mask value, wherein the first mask value indicates a first condition under which interrupt requests may be provided to the first processor;

a second mask register that stores a second mask value, wherein the second mask value indicates a second condition under which interrupt requests may be provided to the second processor;

a first interrupt generating circuit, corresponding to the first processor, that outputs a first interrupt signal to a first processor when the first condition is met by the at least one of the synchronization objects after manipulation; and a second interrupt generating circuit, corresponding to the second processor, that outputs a second interrupt signal to a second processor when the second condition is met by the at least one of the synchronization objects after manipulation.

25. The integrated circuit of claim 24 further comprising a bi-directional bus coupled to the first processor, the second processor, and the synchronization block.

26. The integrated circuit of claim 25 wherein the first interrupt generating circuit provides interrupt requests on a first line and the second interrupt generating circuit provides interrupt requests on a second line, the first line and the second line separate from the bi-directional bus.

27. The integrated circuit of claim 26 wherein the first interrupt generating circuit further receives the first mask value from a first mask register and the second interrupt generating circuit further receives a second mask value from a second mask register.

28. The integrated circuit of claim 26 wherein the first mask value is provided by the first processor and a second mask value is provided by the second processor.

29. The integrated circuit of claim 28 wherein the second interrupt generating circuit provides interrupt signals to the second processor when the received synchronizing objects meet a condition set by the second mask value.

30. The integrated circuit of claim 26 wherein the commands comprise load/store commands.

31. The integrated circuit of claim 26 wherein the synchronization objects comprise semaphores and mailbox registers.

32. The integrated circuit of claim 26 where the operations comprise:

a set operation wherein a value of a synchronization object is set;

a semaphore pend operation wherein when a value of a synchronization object is greater than zero, the value of the synchronization object is decremented; and a semaphore post operation wherein a value of a synchronization object is incremented.

\* \* \* \* \*